United States Patent
Mahira et al.

(10) Patent No.: US 11,408,313 B2
(45) Date of Patent: Aug. 9, 2022

(54) EXHAUST DEVICE FOR INTERNAL COMBUSTION ENGINE OF SADDLED VEHICLE

(71) Applicant: HONDA MOTOR CO., LTD., Tokyo (JP)

(72) Inventors: Hiroshi Mahira, Wako (JP); Masahiro Kontani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 16/496,635

(22) PCT Filed: Mar. 27, 2017

(86) PCT No.: PCT/JP2017/012311
§ 371 (c)(1),
(2) Date: Sep. 23, 2019

(87) PCT Pub. No.: WO2018/179036
PCT Pub. Date: Oct. 4, 2018

(65) Prior Publication Data
US 2020/0318509 A1 Oct. 8, 2020

(51) Int. Cl.
*F01N 1/02* (2006.01)
*F01N 13/18* (2010.01)

(52) U.S. Cl.
CPC ........... *F01N 1/02* (2013.01); *F01N 13/1805* (2013.01); *F01N 2470/12* (2013.01); *F01N 2470/14* (2013.01); *F01N 2590/04* (2013.01)

(58) Field of Classification Search
CPC .. B62M 7/02; F01N 2590/04; F01N 13/1838; F01N 13/1805; F01N 13/141;
(Continued)

(56) References Cited

U.S. PATENT DOCUMENTS 6,250,076 B1 6/2001 Kawamata et al.
8,602,158 B2 12/2013 Hayama et al.
(Continued)

FOREIGN PATENT DOCUMENTS

CN 1704567 A 12/2005
CN 102785734 A 11/2012
(Continued)

OTHER PUBLICATIONS

Official Communication dated Dec. 28, 2020 issued over the corresponding Chinese Patent Application No. 201780088993.4.
(Continued)

*Primary Examiner* — Anthony Ayala Delgado
(74) *Attorney, Agent, or Firm* — Carrier Blackman & Associates, P.C.; William D. Blackman; Joseph P. Carrier

(57) ABSTRACT

An exhaust device for an internal combustion engine of a saddled vehicle includes an exhaust muffler disposed on an outer side of a rear wheel so as to overlap the rear wheel when viewed from a side a muffler protector which covers the muffler. The muffler protector includes an inner protector half body covering the exhaust muffler from the rear wheel side and an outer protector half body covering the exhaust muffler from a vehicle outer side opposite to the rear wheel The inner protector half body is detachably mounted on the exhaust muffler or the outer protector half body while maintaining a state in which the outer protector half body is mounted on the exhaust muffler.

7 Claims, 14 Drawing Sheets

(58) Field of Classification Search
CPC ............... F01N 13/082; F01N 2470/12; F01N 2450/18; F01N 2340/04
See application file for complete search history.

(56) References Cited

U.S. PATENT DOCUMENTS

| | | |
|---|---|---|
| 9,573,459 B2 | 2/2017 | Shimomura |
| 10,539,061 B2 * | 1/2020 | Sasaki ........................ F01N 3/24 |
| 2013/0068554 A1 * | 3/2013 | Hayama .................. F01N 13/14 |
| | | 181/228 |

FOREIGN PATENT DOCUMENTS

| | | | |
|---|---|---|---|
| CN | 103422960 A | 12/2013 | |
| EP | 1577208 A2 * | 9/2005 | ............... F01N 3/05 |
| EP | 2 573 339 A1 | 3/2013 | |
| JP | 2009-162093 A | 7/2009 | |
| JP | 2014-125940 A | 7/2014 | |
| JP | 2016-050538 A | 4/2016 | |

OTHER PUBLICATIONS

Office Action dated Sep. 15, 2020 issued in the corresponding Indian Patent Application No. 201917041862.

* cited by examiner

FIG.13
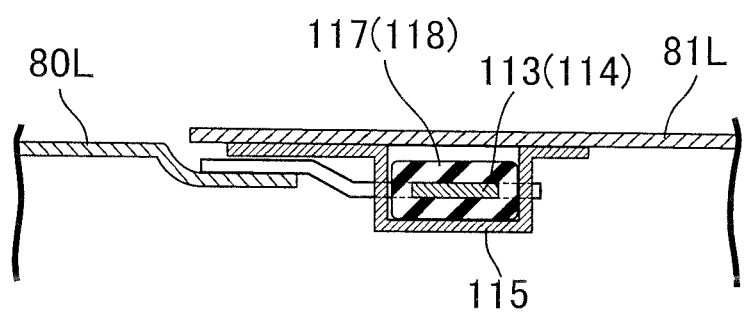
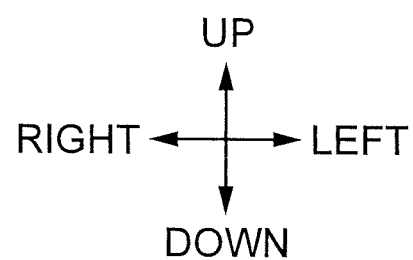

EXHAUST DEVICE FOR INTERNAL COMBUSTION ENGINE OF SADDLED VEHICLE

TECHNICAL FIELD

The present invention relates to an exhaust device for an internal combustion engine of a saddled vehicle, in which an exhaust muffler disposed on an outer side of a rear wheel so as to overlap the rear wheel when viewed from a side is covered by a muffler protector mounted on the exhaust muffler.

BACKGROUND ART

Such an exhaust device for an internal combustion engine of a saddled vehicle is already known from Patent Document 1, and in this arrangement an exhaust muffler is covered by a muffler protector formed from a vertically-split pair of protector half bodies.

RELATED ART DOCUMENTS

Patent Documents

Patent Document 1: Japanese Patent Application Laid-open No. 2016-050538

SUMMARY OF THE INVENTION

Problems to be Solved by the Invention

In a two-wheeled motor vehicle, when carrying out maintenance of a brake component for a rear wheel disposed to the side of an exhaust muffler, exchange of tires, etc., it is required that the maintenance operation is carried out while avoiding the exhaust muffler. However, in the case of the structure as disclosed by the patent document above, in which the exhaust muffler is covered by the muffler protector, the overall size of the exhaust muffler, including the muffler protector, increases; when an attempt is made to carry out maintenance while avoiding the exhaust muffler, it is necessary to dispose the exhaust muffler at a position distant from the rear wheel outward in the vehicle width direction or to temporarily detach the exhaust muffler each time that maintenance is carried out if such positioning is difficult in relation to the bank angle, and there is a problem with setting the overall shape and position of the exhaust muffler, including the muffler protector, in order to enhance the ease of maintenance of the rear wheel or its peripheral equipment.

The present invention has been accomplished in light of such circumstances, and it is an object thereof to provide an exhaust device for an internal combustion engine of a saddled vehicle for which the ease of maintenance is enhanced by enabling the maintenance of a rear wheel or its peripheral equipment to be carried out while avoiding any influence on the bank angle and making it unnecessary to temporarily detach an exhaust muffler.

Means for Solving the Problems

In order to attain the above object, according to a first aspect of the present invention, there is provided an exhaust device for an internal combustion engine of a saddled vehicle in which an exhaust muffler disposed on an outer side of a rear wheel so as to overlap the rear wheel when viewed from a side is covered by a muffler protector mounted on the exhaust muffler, characterized in that the muffler protector comprises an inner protector half body covering the exhaust muffler from the rear wheel side and an outer protector half body covering the exhaust muffler from a vehicle outer side that is opposite to the rear wheel, and the inner protector half body is detachably mounted on the exhaust muffler or the outer protector half body while maintaining a state in which the outer protector half body is mounted on the exhaust muffler.

Further, according to a second aspect of the present invention, in addition to the first aspect, the outer protector half body is formed so that the exhaust muffler is covered along an entire length in a longitudinal direction, and the inner protector half body is formed so as to cover a rear part of the exhaust muffler in a vehicle fore-and-aft direction.

According to a third aspect of the present invention, in addition to the first or second aspect, the outer protector half body, which has a shape opening toward the rear wheel side, and the inner protector half body, which has a shape opening toward a side opposite to the rear wheel, are combined so as to have a polygonal cross-sectional shape and form a corner part, on the rear wheel side, of an upper side of the polygon by means of the inner protector half body.

According to a fourth aspect of the present invention, in addition to any one of the first to third aspects, the exhaust muffler covered by the muffler protector is disposed on opposite sides in a vehicle width direction of the rear wheel.

According to a fifth aspect of the present invention, in addition to any one of the first to fourth aspects, the inner protector half body is detachably mounted on the outer protector half body mounted on the exhaust muffler.

According to a sixth aspect of the present invention, in addition to the fifth aspect, a plurality of projecting pieces fixed to the inner protector half body are inserted and retained via rubbers by retaining parts provided at a plurality of locations on a reverse face of the outer protector half body.

According to a seventh aspect of the present invention, in addition to the fifth or sixth aspect, a lower part of the inner protector half body is fixed to a lower part of the outer protector half body by means of a single fastening member.

Moreover, according to an eighth aspect of the present invention, in addition to the seventh aspect, a stay is provided on the lower part of the inner protector half body, the stay having a mounting portion projecting upward from an inner face of the lower part of the inner protector half body, an opening corresponding to the mounting portion is formed in the lower part of the inner protector half body, and the mounting portion is fastened to the lower part of the outer protector half body by means of the fastening member inserted into the opening.

Fifth and sixth projecting pieces 113 and 114 of an embodiment correspond to the projecting piece of the present invention, fifth and sixth retaining parts 115 and 116 of the embodiment correspond to the retaining part of the present invention, rubbers 117 and 118 of the embodiment correspond to the rubber of the present invention, and a fourth screw member 121 of the embodiment corresponds to the fastening member of the present invention.

Effects of the Invention

In accordance with the first aspect of the present invention, since detaching and attaching the inner protector half body, which covers the exhaust muffler from the rear wheel side so as to form the muffler protector in cooperation with the outer protector half body, can be carried out while maintaining a state in which the outer protector half body is mounted on the exhaust muffler, although the overall dimensions of the exhaust muffler, including the muffler protector, increase, it is possible to carry out maintenance by detaching only the inner protector half body, and maintenance can be carried out without temporarily detaching the exhaust muffler each time maintenance is carried out while avoiding any influence on the bank angle by making it unnecessary to dispose the exhaust muffler at a position spaced from the rear wheel on the outer side in the vehicle width direction, thus enhancing the ease of maintenance.

Furthermore, in accordance with the second aspect of the present invention, whereas the outer protector half body covers the exhaust muffler along the whole length in the longitudinal direction, the inner protector half body is formed so as to cover the rear part of the exhaust muffler, thereby making it possible to avoid any degradation of the appearance when viewed from the side opposite to the exhaust muffler with respect to the rear wheel while minimizing the dimensions of the inner protector half body forming part of the muffler protector.

In accordance with the third aspect of the present invention, since the outer protector half body and the inner protector half body, which are combined with each other, are combined so as to have a polygonal cross-sectional shape, and the inner protector half body has a shape opening toward the side opposite to the rear wheel so as to include the corner part, on the rear wheel side, of the upper side of the polygon, the area that can be accessed from above the exhaust muffler is widened when only the inner protector half body is detached, further enhancing the ease of maintenance.

In accordance with the fourth aspect of the present invention, since the exhaust mufflers covered by the muffler protectors are disposed on opposite sides in the vehicle width direction of the rear wheel, when carrying out maintenance of different parts from opposite sides of the rear wheel it is unnecessary to temporarily detach the exhaust mufflers on the opposite sides, and maintenance can be carried out by detaching only the inner protector half body, thus enhancing the ease of maintenance.

In accordance with the fifth aspect of the present invention, since the inner protector half body is detachably mounted on the outer protector half body, it makes difficult for heat to be transferred from the exhaust muffler to the inner protector half body, and the time waiting for the temperature of the inner protector half body to decrease when carrying out maintenance can be shortened.

In accordance with the sixth aspect of the present invention, since the plurality of projecting pieces on the inner protector half body side are inserted into and retained via the rubber by the plurality of retaining parts on the reverse face of the outer protector half body, it is possible, by preventing the structure via which the inner protector half body is retained by the outer protector half body from being exposed to the outside, to avoid any degradation in the appearance of the muffler protector.

In accordance with the seventh aspect of the present invention, since the lower part of the inner protector half body is fixed to the lower part of the outer protector half body by means of the single fastening member, it is possible to strongly fix the inner protector half body to the outer protector half body at an inconspicuous position.

Furthermore, in accordance with the eighth aspect of the present invention, since the mounting portion of the mounting stay provided on the lower part of the inner protector half body is fastened to the lower part of the outer protector half body above the inner face of the lower part of the inner protector half body by means of the fastening member inserted into the opening formed in the lower part of the inner protector half body, it is possible to make it difficult for the fastening member to be seen from the side of the muffler protector, thus improving the appearance.

BRIEF DESCRIPTION OF DRAWINGS

FIG. 13 is a sectional view along line 13-13 in FIG. 11. (first embodiment)

EXPLANATION OF REFERENCE NUMERALS AND SYMBOLS

Figure 1:
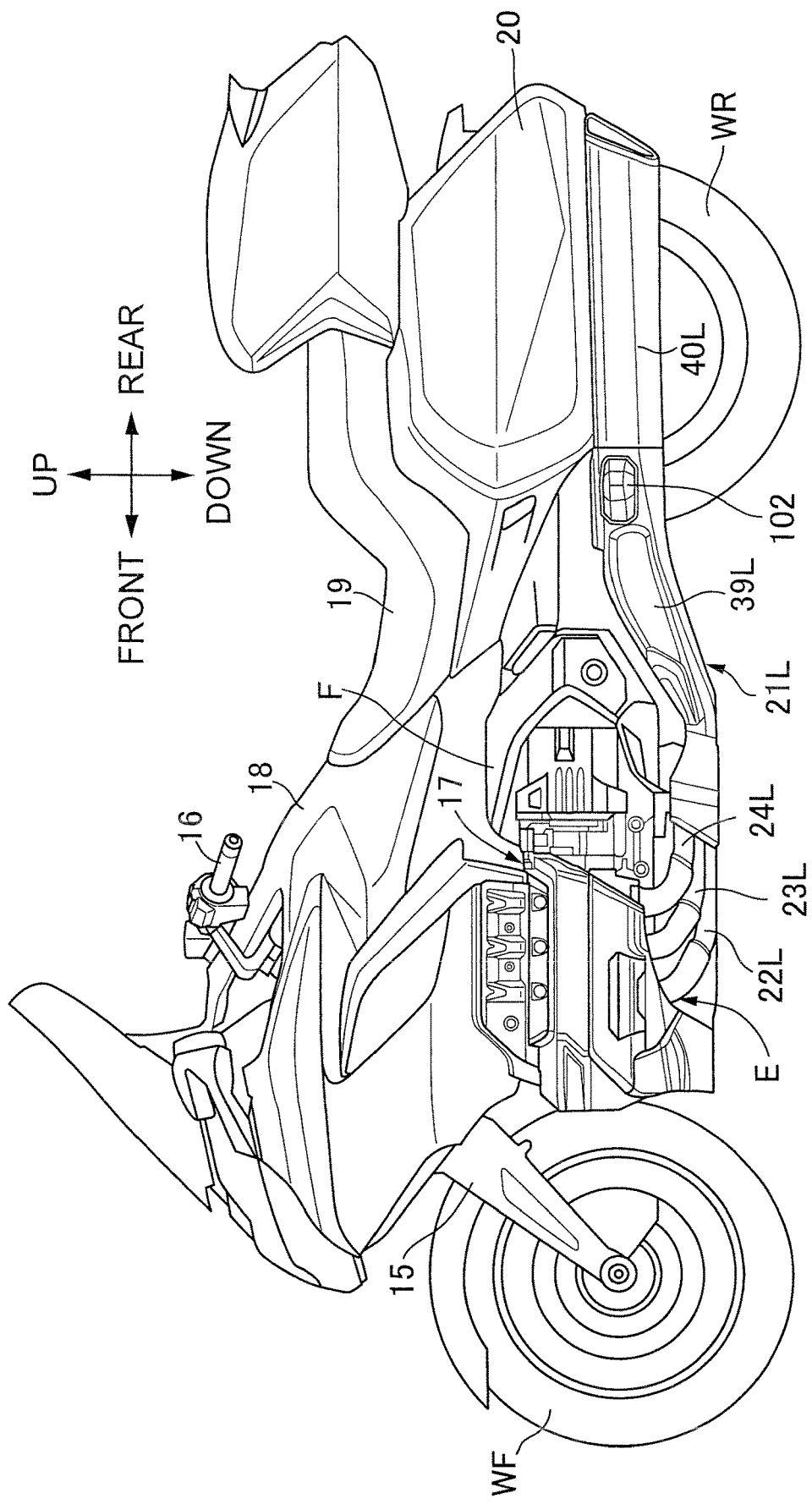
FIG. 1 is a left side view of a two-wheeled motor vehicle. (first embodiment)

21L, 21R Exhaust device
30L, 30R Exhaust muffler
40L, 40R Muffler protector
80L, 80R Inner protector half body
81L, 81R Outer protector half body
113 Fifth projecting piece, which is a projecting piece
114 Sixth projecting piece, which is a projecting piece
115 Fifth retaining part, which is a retaining part
116 Sixth retaining part, which is a retaining part
117, 118 Rubber
121 Fourth screw member, which is a fastening member
122 Third stay, which is a stay
122a Mounting portion
125 Opening
127 Corner part
WR Rear wheel

MODE FOR CARRYING OUT THE INVENTION

An embodiment of the present invention is explained by reference to FIG. 1 to FIG. 13. In the explanation below, front and rear, up and down, and left and right mean directions as viewed by a person riding a two-wheeled motor vehicle.

First Embodiment

First, in FIG. 1, a front fork 15 and bar-shaped handlebars 16 are steerably supported on a front end part of a vehicle body frame F of a two-wheeled motor vehicle, which is a saddled vehicle, a front wheel WF being axially supported on a lower end part of the front fork 15, and an engine main body 17 of an internal combustion engine E, which is a horizontally-opposed six cylinder engine exerting power for driving a rear wheel WR, is mounted on the vehicle body frame F so that three cylinders are disposed on each of left and right sides. A fuel tank 18 disposed above the engine main body 17 is supported on the vehicle body frame F, a riding seat 19 is disposed to the rear of the fuel tank 18, and a saddle bag 20 is disposed beneath the left and the right sides of a rear part of the riding seat 19.

Figure 2:
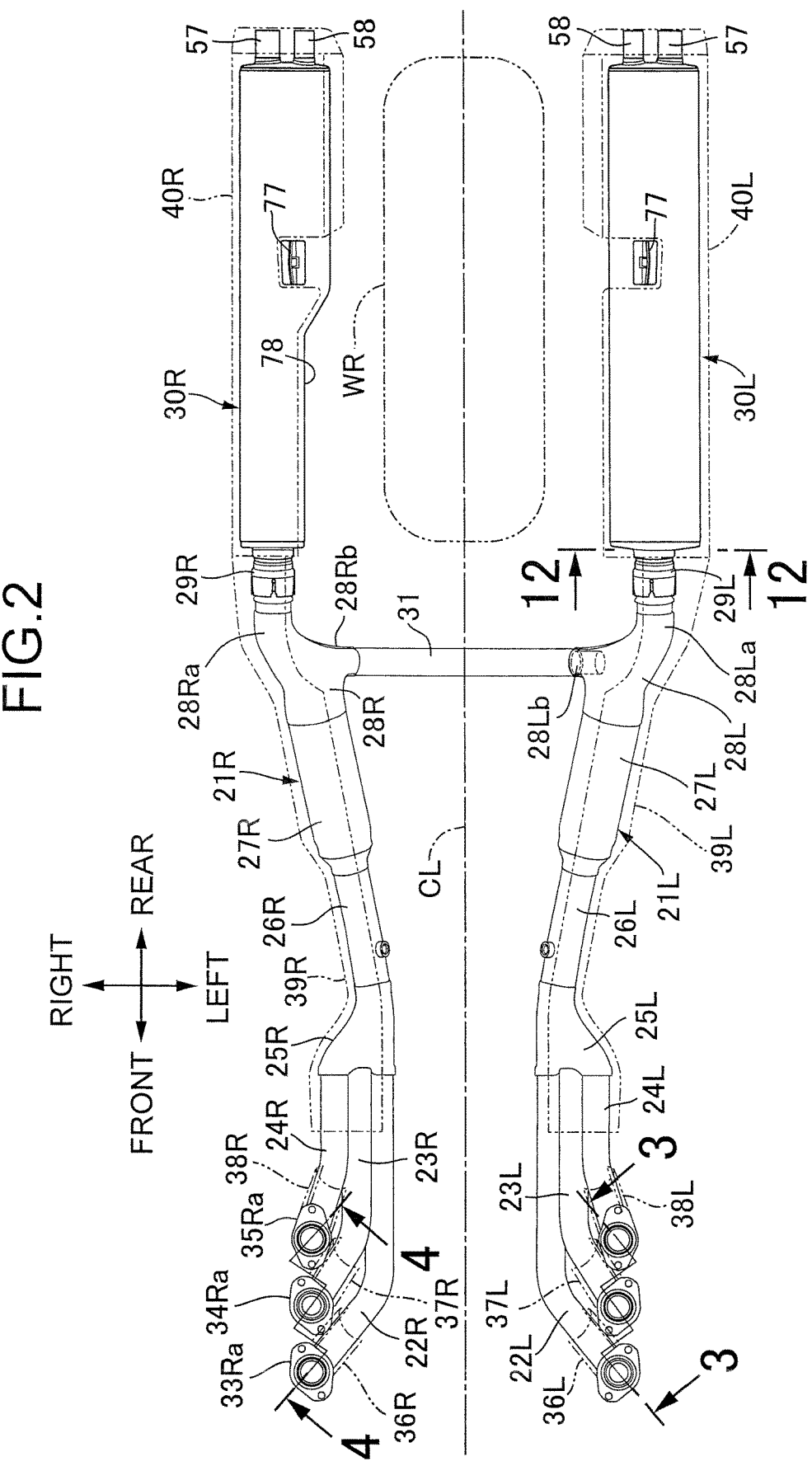
FIG. 2 is a plan view of an exhaust device of an internal combustion engine. (first embodiment)

Referring in addition to FIG. 2, connected to the engine main body 17 are left and right exhaust devices 21L and 21R, which are separately positioned on the left and right of a vehicle body center line CL passing through the center in the width direction of the vehicle body. The left exhaust device 21L includes left first, second, and third individual exhaust pipes 22L, 23L, and 24L individually corresponding to each cylinder of a left cylinder head (not illustrated) of the engine main body 17, a left confluence pipe 25L to which downstream ends of the left first to third individual exhaust pipes 22L to 24L are connected in common so that exhaust gas flowing through the individual exhaust pipes 22L to 24L is combined, a left collecting exhaust pipe 26L connected to the downstream end of the left confluence pipe 25L and extending rearward, a left catalytic converter 27L having an upstream end connected to the downstream end of the left collecting exhaust pipe 26L, a left branched pipe 28L having an upstream end connected to the downstream end of the left catalytic converter 27L, and a left exhaust muffler 30L connected to the left branched pipe 28L and disposed on the left outer side, in the vehicle width direction, of the rear wheel WR while overlapping the rear wheel WR when viewed from the side.

The right exhaust device 21R includes right first, second, and third individual exhaust pipes 22R, 23R, and 24R individually corresponding to each cylinder of a right cylinder head (not illustrated) of the engine main body 17, a right confluence pipe 25R to which downstream ends of the right first to third individual exhaust pipes 22R to 24R are connected in common so that exhaust gas flowing through the individual exhaust pipes 22R to 24R is combined, a right collecting exhaust pipe 26R connected to the downstream end of the right confluence pipe 25R and extending rearward, a right catalytic converter 27R having an upstream end connected to the downstream end of the right collecting exhaust pipe 26R, a right branched pipe 28R having an upstream end connected to the downstream end of the right catalytic converter, and a right exhaust muffler 30R connected to the right branched pipe 28R and disposed on the right outer side in the vehicle width direction of the rear wheel WR while overlapping the rear wheel WR when viewed from the side.

The left branched pipe 28L has a main branched pipe portion 28La connected to the left exhaust muffler 30L and an auxiliary branched pipe portion 28Lb and is formed into a bifurcated shape, and the right branched pipe 28R has a main branched pipe portion 28Ra connected to the right exhaust muffler 30R and an auxiliary branched pipe portion 28Rb and is formed into a bifurcated shape. Moreover, the auxiliary branched pipe portion 28Lb of the left branched pipe 28L and the auxiliary branched pipe portion 28Rb of the right branched pipe 28R are connected to opposite end parts of a communication pipe 31 extending in the vehicle width direction in front of the rear wheel WR.

Figure 3:
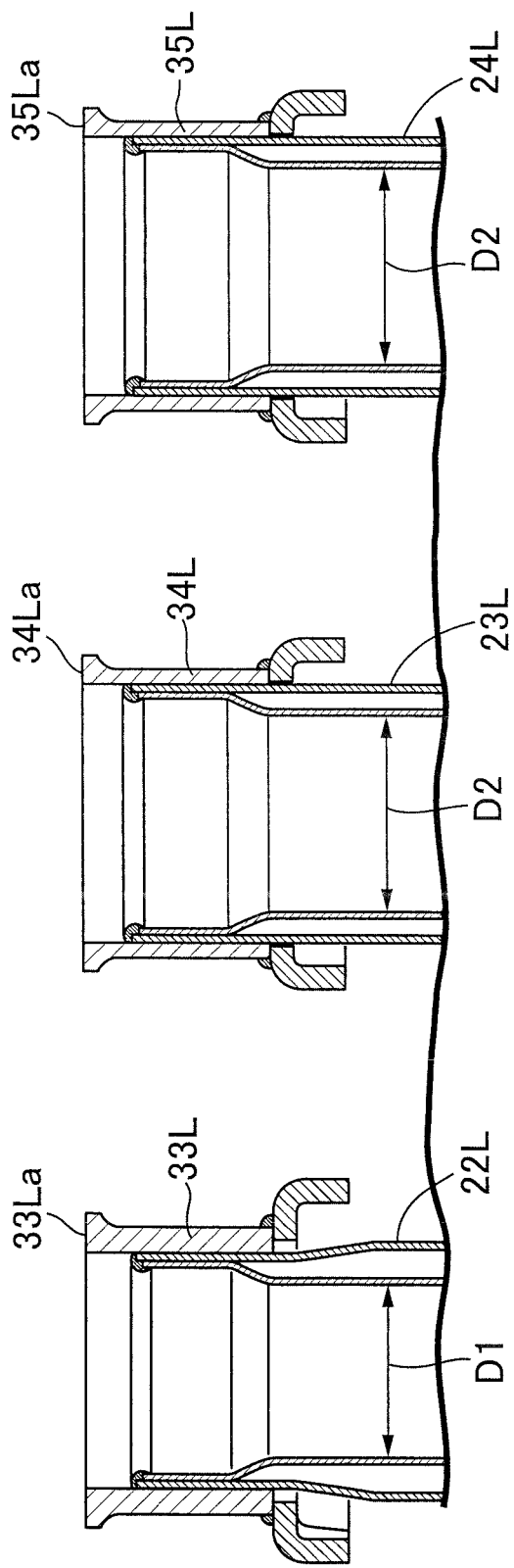
FIG. 3 is a sectional view along line 3-3 in FIG. 2. (first embodiment)

In FIG. 3, the left first to third individual exhaust pipes 22L to 24L are each formed into a double pipe shape, left first, second, and third connecting pipes 33L, 34L, and 35L having flange portions 33La, 34La, and 35La are individually fitted and fixed to upstream ends of the left first to third individual exhaust pipes 22L to 24L, and the flange portions 33La to 35La are joined to the left cylinder head. The left first, second and third individual exhaust pipes 22L to 24L are arranged side by side in the vehicle width direction so that the left first individual exhaust pipe 22L in front in the vehicle fore-and-aft direction is disposed on the innermost side in the vehicle width direction, and extend rearward in the vehicle fore-and-aft direction.

Figure 4:
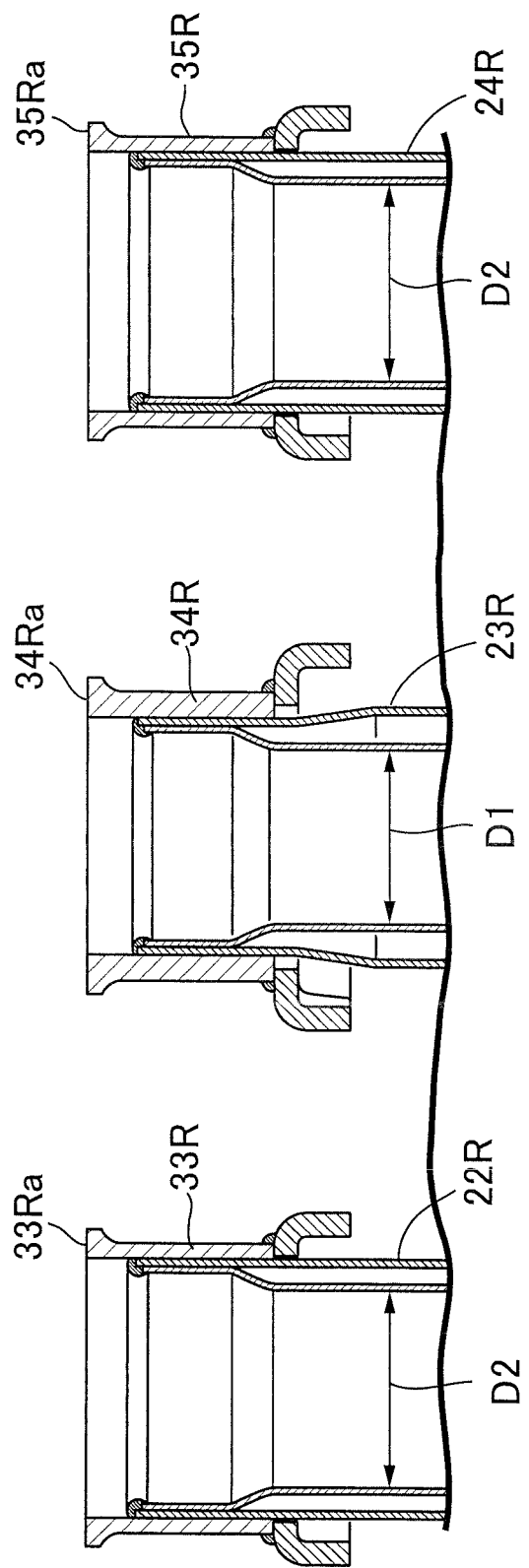
FIG. 4 is a sectional view along line 4-4 in FIG. 2. (first embodiment)

In FIG. 4, the right first to third individual exhaust pipes 22R to 24R are each formed into a double pipe shape, right first, second, and third connecting pipes 33R, 34R, and 35R having flange portions 33Ra, 34Ra, and 35Ra are individually fitted and fixed to upstream ends of the right first to third individual exhaust exhaust pipes 22R to 24R, and the flange portions 33Ra to 35Ra are joined to the right cylinder head. The right first, second, and third individual exhaust pipes 22R to 24R are arranged side by side in the vehicle width direction so that the right first individual exhaust pipe 22R in front in the vehicle fore-and-aft direction is disposed on the innermost side in the vehicle width direction, and extend rearward in the vehicle fore-and-aft direction.

Some of the left first to third individual exhaust pipes 22L to 24L and some of the right first to third individual exhaust pipes 22R to 24R are formed so as to have different internal diameters from those of the other exhaust pipes in order to obtain a characteristic exhaust noise, and in this embodiment, as shown in FIG. 3, an internal diameter D1 of the left first individual exhaust pipe 22L is set to be smaller than an internal diameter D2 of the left second and third individual exhaust pipes 23L and 24L (D1 <D2) and, as shown in FIG. 4, the internal diameter D1 of the right second individual exhaust pipe 23R is set to be smaller than the internal diameter D2 of the right first and third individual exhaust pipes 22R and 24R (D1<D2).

As shown by a chain line in FIG. 2, the left first to third individual exhaust pipes 22L to 24L are covered from above by left first, second, and third individual exhaust pipe covers 36L, 37L, and 38L individually mounted on the individual exhaust pipes 22L to 24L, and the right first to third individual exhaust pipes 22R to 24R are covered from above by right first, second, and third individual exhaust pipe covers 36R, 37R, and 38R individually mounted on the individual exhaust pipes 22R to 24R. A section from the left confluence pipe 25L, via the left collecting exhaust pipe 26L, the left catalytic converter 27L, and the left branched pipe 28L, to a front end part of the left exhaust muffler 30L is covered by a left collecting exhaust pipe cover 39L from above and the left, and a section from the right confluence pipe 25R, via the right collecting exhaust pipe 26R, the right catalytic converter 27R, and the right branched pipe 28R, to a front end part of the right exhaust muffler 30R is covered by a right collecting exhaust pipe cover 39R from above and the right. The left exhaust muffler 30L is covered by a left muffler protector 40L, and the right exhaust muffler 30R is covered by a right muffler protector 40R.

Figure 5:
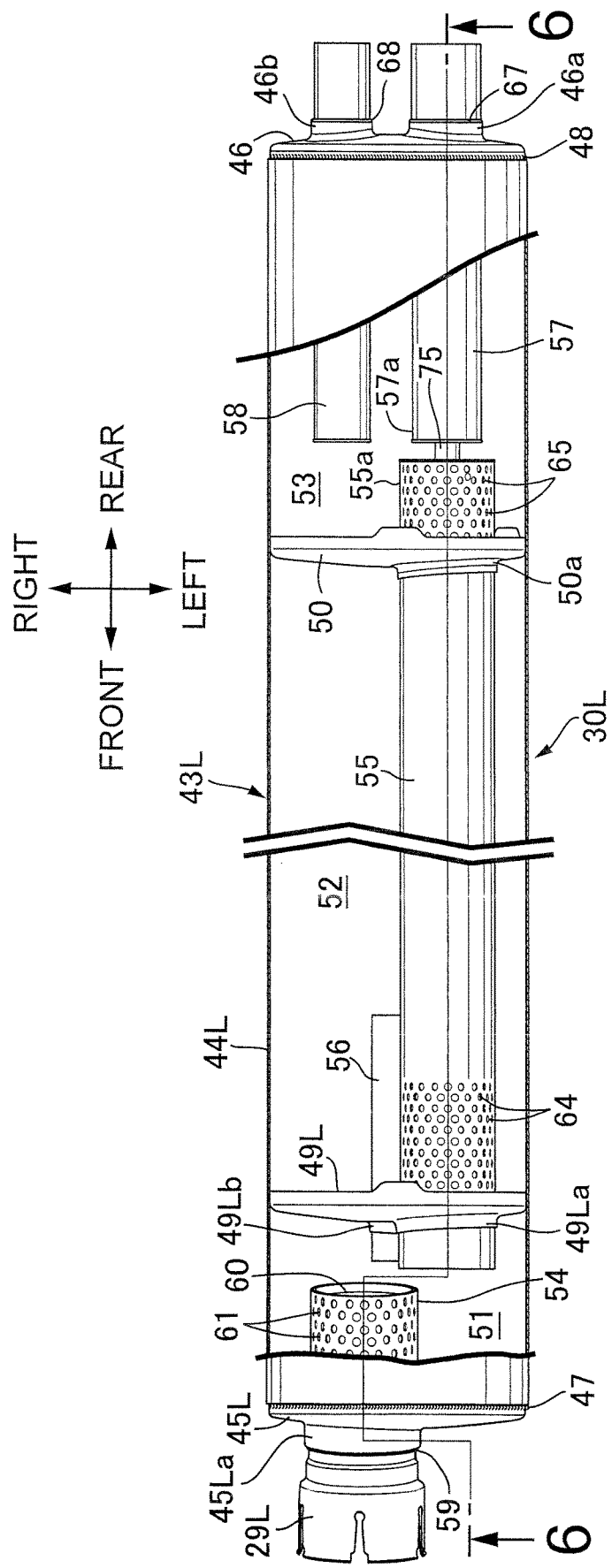
FIG. 5 is a sectional plan view of a left exhaust muffler. (first embodiment)
Figure 6:
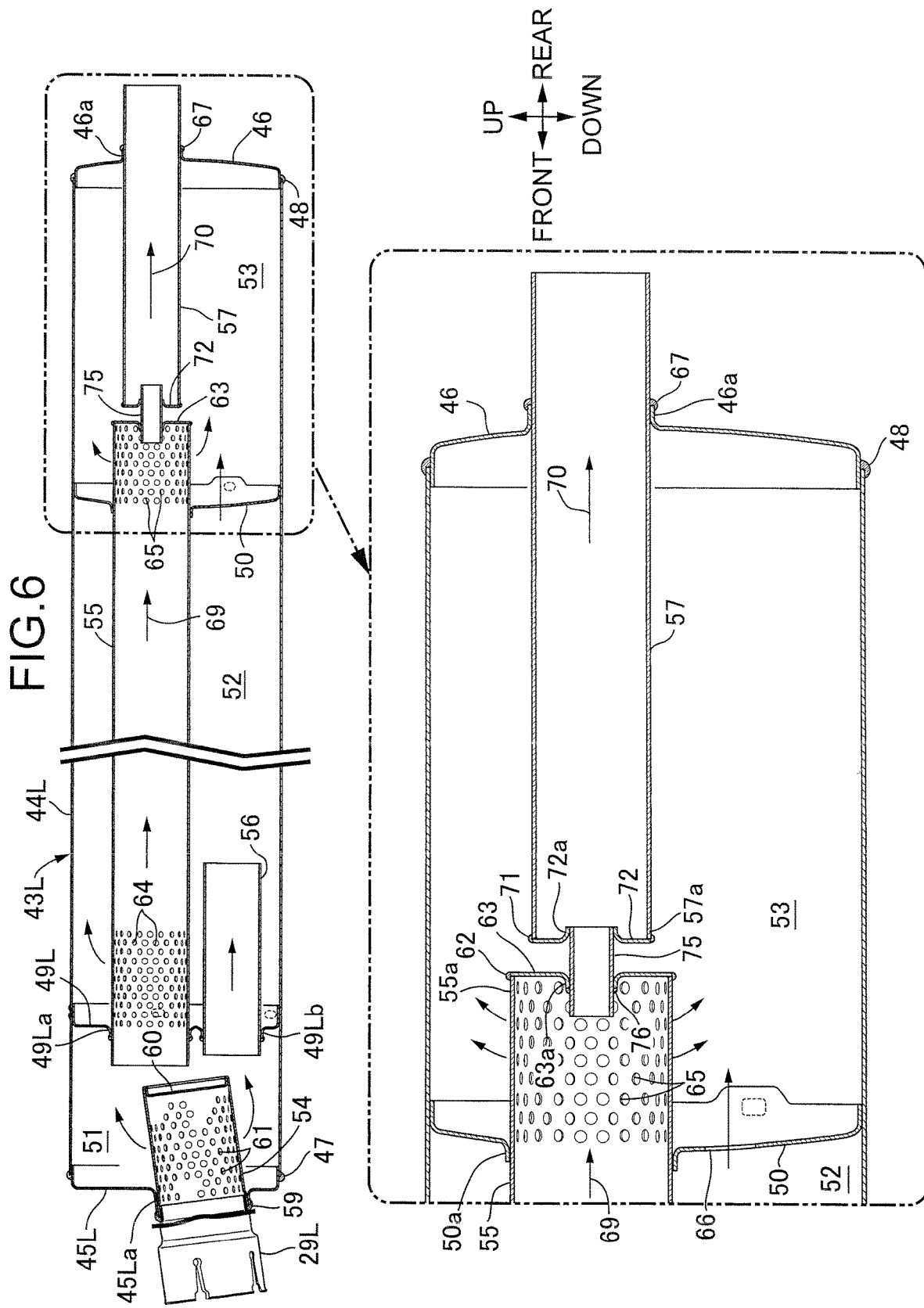
FIG. 6 is a sectional view along line 6-6 in FIG. 5. (first embodiment)

In FIG. 5 and FIG. 6, a casing 43L of the left exhaust muffler 30L is formed from a cylindrical casing main body 44L, a front end wall 45L joined to a front end part of the casing main body 44L along the vehicle fore-and-aft direction by means of welding of a first weld part 47, and a rear end wall 46 joined to a rear end part of the casing main body 44L along the vehicle fore-and-aft direction by means of welding of a second weld part 48.

The interior of the casing 43L is divided into a plurality of expansion chambers 51, 52, and 53 by means of a plurality of partition walls 49L and 50 disposed with a gap therebetween in the vehicle fore-and-aft direction, and in this embodiment the outer periphery of the first and second partition walls 49L and 50 is fixed to an inner face of the casing main body 44L by welding at positions spaced in the vehicle fore-and-aft direction. Formed within the casing 43L are the first expansion chamber 51 between the front end wall 45L and the first partition wall 49L, the second expansion chamber 52 between the first and second partition walls 49L and 50, and the third expansion chamber 53 between the second partition wall 50 and the rear end wall 46.

The left exhaust muffler 30L includes a plurality of pipes extending through any of the casing 43L and the first and second partition walls 49L and 50 so that exhaust gas flows, and in this embodiment the left exhaust muffler 30L includes an inlet pipe 54 extending through the front end wall 45L of the casing 43L, a first communication pipe 55 extending through the first and second partition walls 49L and 50, a second communication pipe 56 extending through the first partition wall 49L, a first tailpipe 57 disposed coaxially with the first communication pipe 55 and extending through the rear end wall 46 of the casing 43L, and a second tailpipe 58 arranged on the inner side in the vehicle width direction of the first tailpipe 57 and extending through the rear end wall 46.

A cylindrical first support tube portion 45La projecting forward with an axis inclined downward to the front is projectingly provided integrally with the front end wall 45L of the casing 43L, and a front end part, in the vehicle fore-and-aft direction, of the inlet pipe 54 inclined downward to the front is inserted into the first support tube 45La. On the other hand, the downstream end of a left connecting pipe 29L is fitted onto a front end part of the inlet pipe 54, the main branched pipe portion 28La of the left branched pipe 28L being fitted into and connected to the left connecting pipe 29L, and the front edge of the first support tube portion 45La is welded to the front edge of the inlet pipe 54 and the outer periphery of the left connecting pipe 29L via a third weld part 59.

The downstream end of the inlet pipe 54 is closed by a plate-shaped plug member 60 press fitted into the inlet pipe 54, and a plurality of first punched holes 61 are formed in the side wall of the inlet pipe 54 within the first expansion chamber 51. Exhaust gas introduced into the left exhaust muffler 30L via the inlet pipe 54 is therefore dispersed within the first expansion chamber 51 via the plurality of first punched holes 61.

Second and third support tube portions 49La and 49Lb projecting toward the first expansion chamber 51 side are projectingly provided integrally with the first partition wall 49L, and the second communication pipe 56 is fitted into and supported on the third support tube portion 49Lb, which is disposed further downward than the second support tube portion 49La, opposite ends of the second communication pipe 56 opening in the first and second expansion chambers 51 and 52. That is, the first and second expansion chambers 51 and 52 communicate with each other via the second communication pipe 56.

A fourth support tube portion 50a that is coaxial with and has the same diameter as that of the second support tube portion 49La is projectingly provided integrally with the second partition wall 50 so as to project toward the second expansion chamber 52 side, and the first communication pipe 55 is fitted into and supported on the third and the fourth support tube portions 49La and 50a so that its upstream end opens in the first expansion chamber 51. That is, the first communication pipe 55 extends through the first and second partition walls 49L and 50.

A downstream end 55a of the first communication pipe 55 along a flow direction 69 of exhaust gas within the first communication pipe 55 projects into the third expansion chamber 53, and an opening at the downstream end 55a of the first communication pipe 55 is covered by a first lid member 63 welded to the first communication pipe 55 via a fourth weld part 62. Of the side wall of the first communication pipe 55, a plurality of punched holes are formed in at least the side wall on the downstream side; in this embodiment, a plurality of second punched holes 64 are formed in the side wall of a portion, close to the first partition wall 49L within the second expansion chamber 52, of the first communication pipe 55, and a plurality of third punched holes 65 are formed in the side wall of a portion, facing the third expansion chamber 53 on the downstream side, of the first communication pipe 55. Exhaust gas introduced into the first expansion chamber 51 is therefore guided to the second expansion chamber 52 via the second communication pipe 56, is dispersed from the interior of the first communication pipe 55 into the second expansion chamber 52 via the second punched holes 64, and is further dispersed from the first communication pipe 55 into the third expansion chamber 53 via the third punched holes 65. A communication hole 66 is bored in the second partition wall 50, and exhaust gas flows from the second expansion chamber 52 to the third expansion chamber 53 via the communication hole 66.

Fifth and sixth support tube portions 46a and 46b extending in the vehicle fore-and-aft direction are projectingly provided integrally with the rear end wall 46 of the casing 43L so as to project rearward in the vehicle fore-and-aft direction, the fifth support tube portion 46a being disposed coaxially with the first communication pipe 55, and the sixth support tube portion 46b being disposed further on the inner side than the fifth support tube portion 46a in the vehicle width direction, that is, on the rear wheel WR side.

The first tailpipe 57 extends through the fifth support tube portion 46a and is disposed coaxially with the first communication pipe 55, and the outer periphery of the first tailpipe 57 is welded to the rear edge of the fifth support tube portion 46a via a fifth weld part 67. The second tailpipe 58 extends through the sixth support tube portion 46b, the outer periphery of the second tailpipe 58 is welded to the rear edge of the sixth support tube portion 46b via a sixth weld part 68, and exhaust gas within the third expansion chamber 53 is discharged outside via the second tailpipe 58.

The downstream end 55a of the first communication pipe 55, which is a first pipe among the plurality of pipes of the left exhaust muffler 30L, and an upstream end 57a of the first tailpipe 57 along a flow direction 70 of exhaust gas flowing in the interior of the first tailpipe 57, which is a second pipe among the plurality of pipes, are disposed so as to be spaced from each other in the axial direction. An opening at the upstream end 57a of the first tailpipe 57 having an external diameter that is smaller than that of the first communication pipe 55 is covered by a second lid member 72 welded to the first tailpipe 57 via a seventh weld part 71.

One end part of a support member 75 having a circular cross section that has a smaller diameter than that of the first communication pipe 55 and the first tailpipe 57 is fixed to one of the first lid member 63 of the downstream end 55a of the first communication pipe 55 and the second lid member 72 of the upstream end 57a of the first tailpipe 57, in this embodiment the first lid member 63, and the other end part of the support member 75 is slidably fitted into the other of the first and the second lid members 63 and 72, in this embodiment the second lid member 72.

Opposite end parts of the support member 75, which is formed from a cylindrical pipe material and is disposed coaxially with the first communication pipe 55 and the first tailpipe 57, extend through the first lid member 63 and the second lid member 72 and are positioned, a seventh support tube portion 63a is projectingly provided integrally with the first lid member 63 so as to project to the side opposite to the second lid member 72, the one end part of the support member 75 extending through the seventh support tube portion 63a, and an outer peripheral face of the one end part of the support member 75 is welded to the projecting edge of the seventh support tube portion 63a via an eighth weld part 76. An eighth support tube portion 72a is projectingly provided integrally with the second lid member 72 so as to project to the side opposite to the first lid member 63, and the downstream end of the support member 75 is slidably fitted into the eighth support tube portion 72a.

The upstream end of the support member 75 opens coaxially within the downstream end 55a of the first communication pipe 55. The downstream end of the support member 75 opens coaxially within the first tailpipe 57, and part of the exhaust gas that has flowed through the interior of the first communication pipe 55 up to the downstream end 55a is guided into the first tailpipe 57 via the support member 75 and discharged to the outside via the first tailpipe 57.

A support arm 77 extending upward is fixed to an upper face of an intermediate part, in the fore-and-aft direction, of the casing 43L of the left exhaust muffler 30L, and an upper end part of the support arm 77 is supported on a rear part of the vehicle body frame F.

The right exhaust muffler 30R has the same basic internal structure as that of the left exhaust muffler 30L although part of the casing 43L has a different shape from that of the left exhaust muffler 30L; in the explanation of the right exhaust muffler 30R below parts corresponding to those of the left exhaust muffler 30L are denoted by the same reference numerals and symbols and only illustrated, and detailed explanation thereof is omitted.

Figure 7:
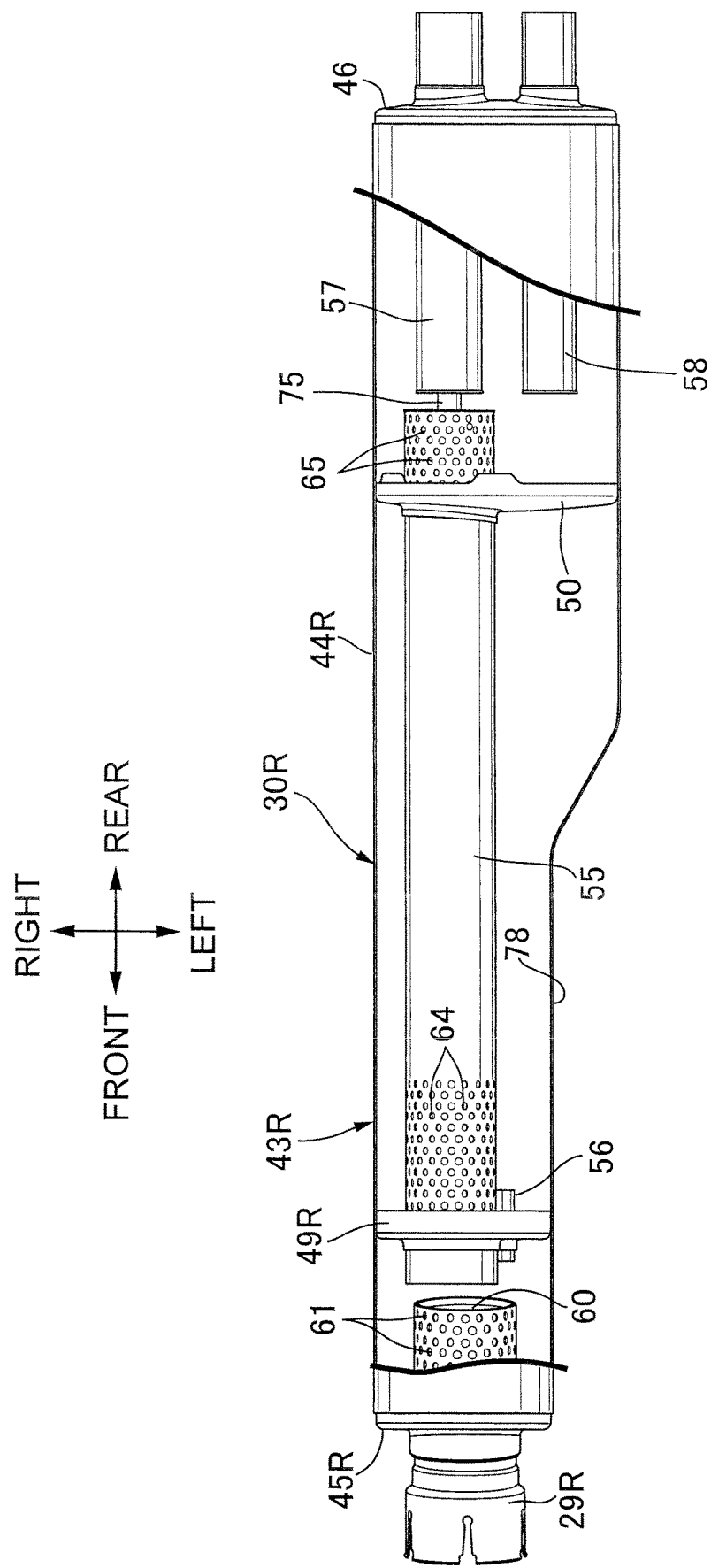
FIG. 7 is a sectional plan view of a right exhaust muffler. (first embodiment)
Figure 8:
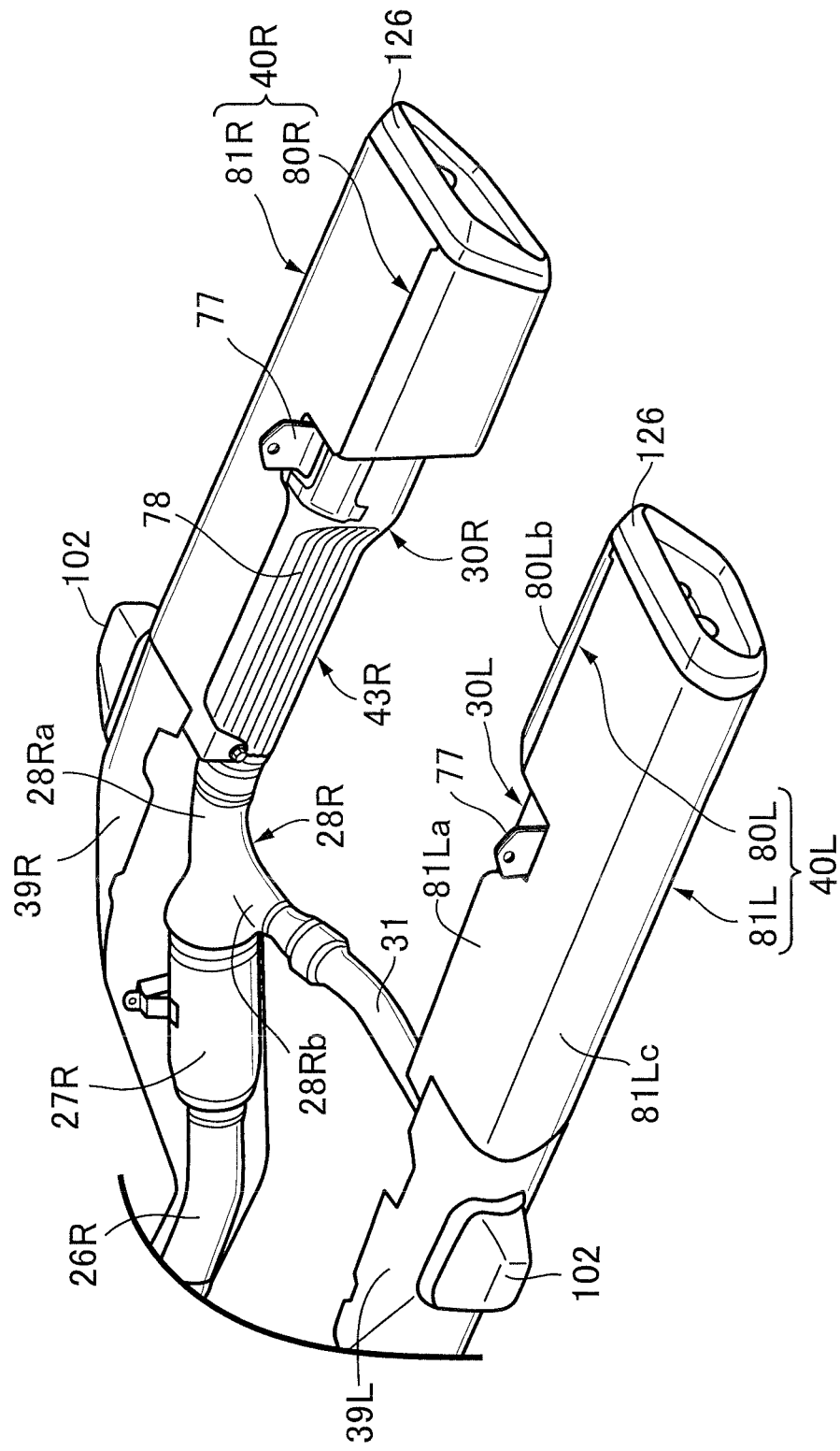
FIG. 8 is a perspective view of a rear part of the exhaust device when viewed from the rear left side and obliquely upward. (first embodiment)
Figure 9:
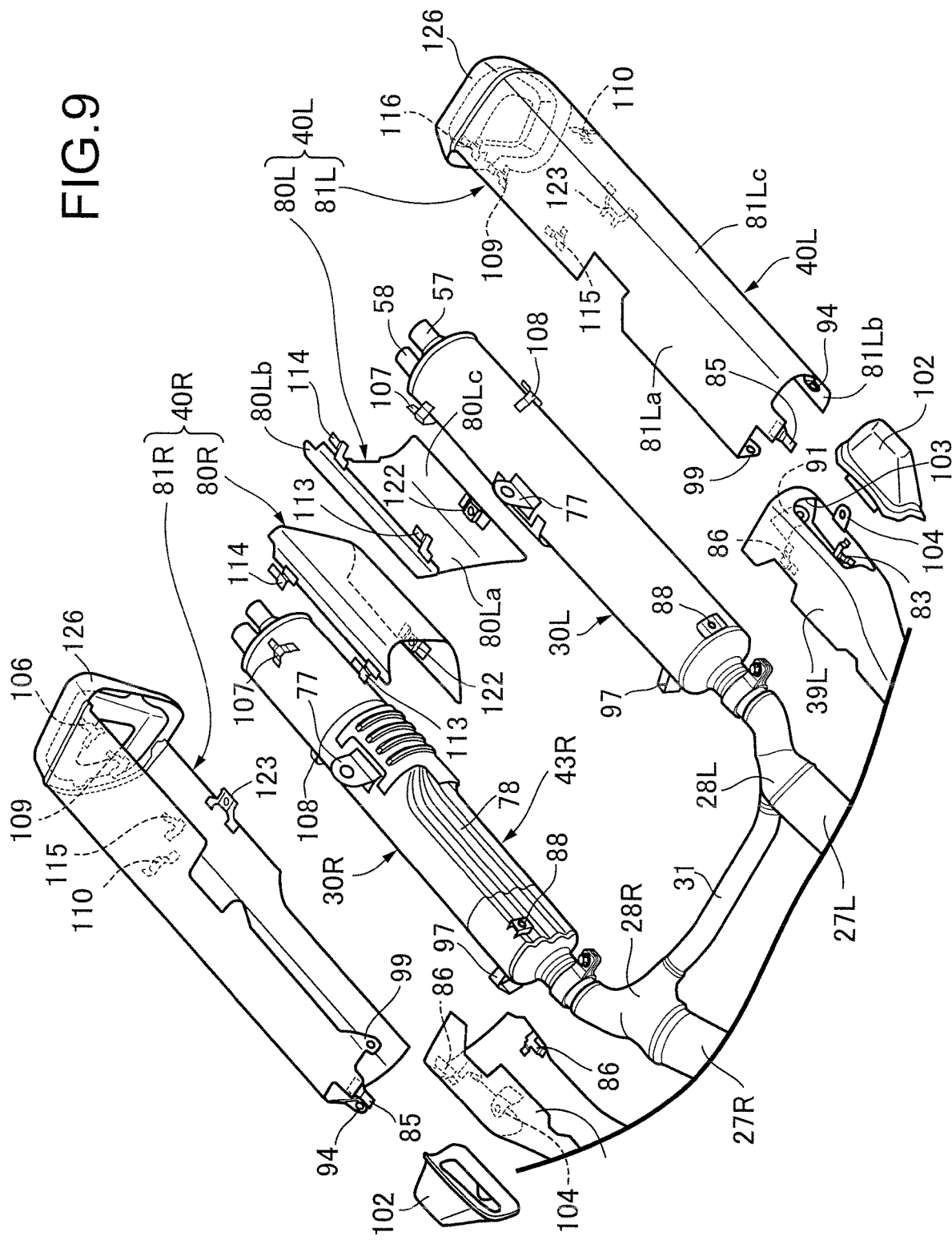
FIG. 9 is an exploded perspective view of the rear part of the exhaust device when viewed from the front left side and obliquely upward. (first embodiment)
Figure 10:
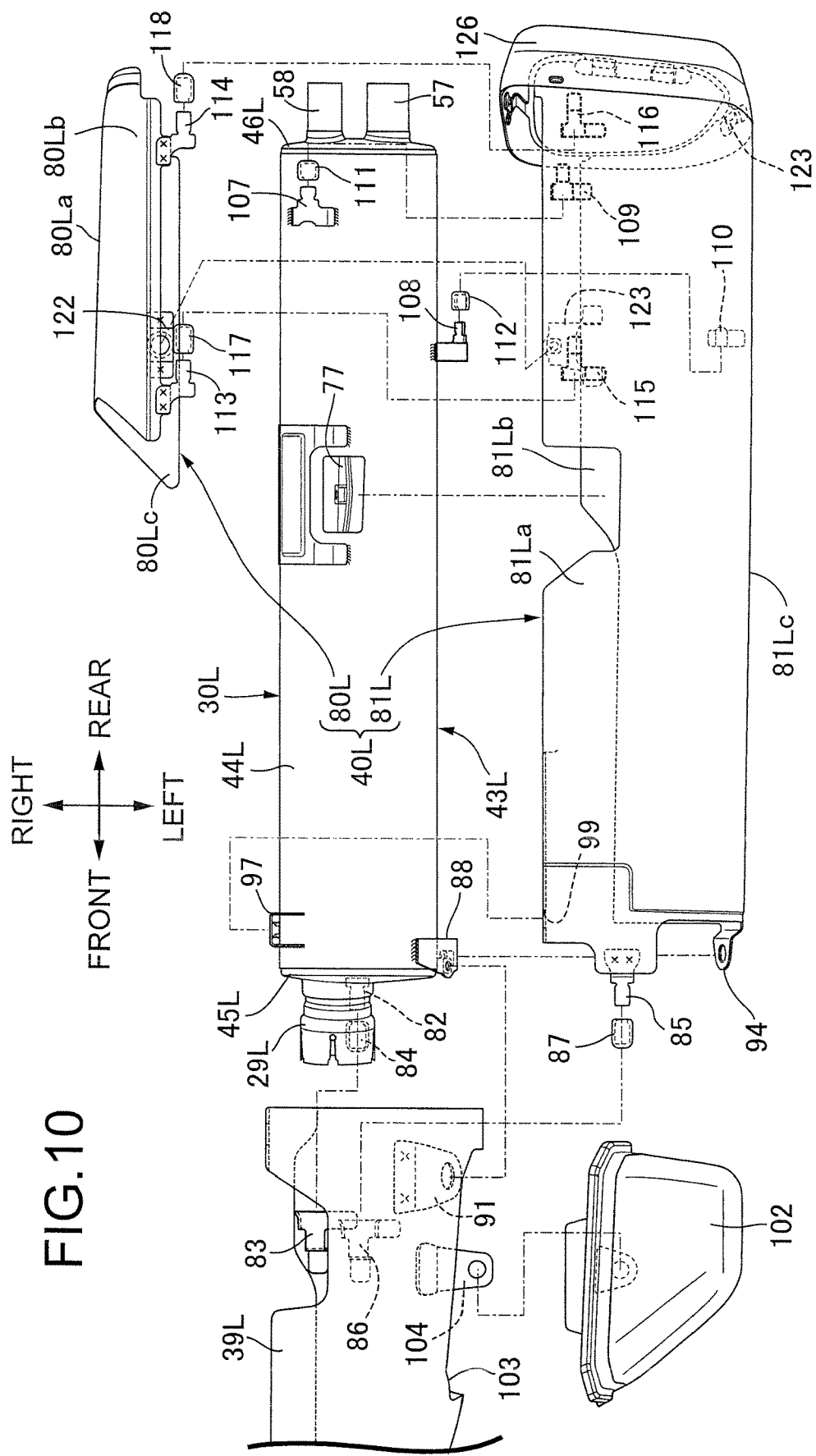
FIG. 10 is an exploded plan view of the left exhaust muffler, a rear part of a left common exhaust pipe cover, the left exhaust muffler, a left outer muffler, and a left inner muffler. (first embodiment)
Figure 11:
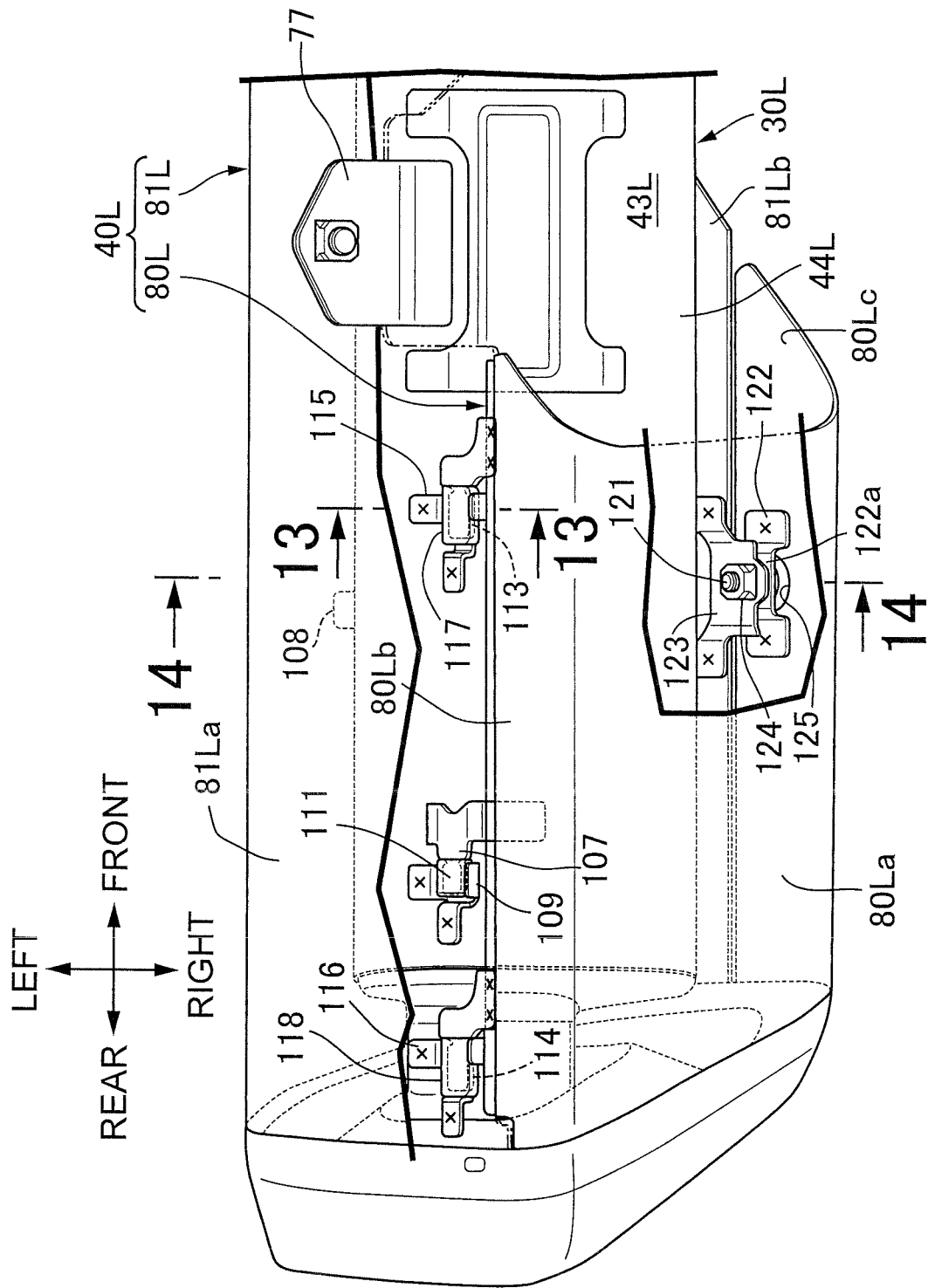
FIG. 11 is a partially cutaway perspective view of a rear part of the left exhaust muffler when viewed from the front right side and obliquely upward. (first embodiment)
Figure 12:
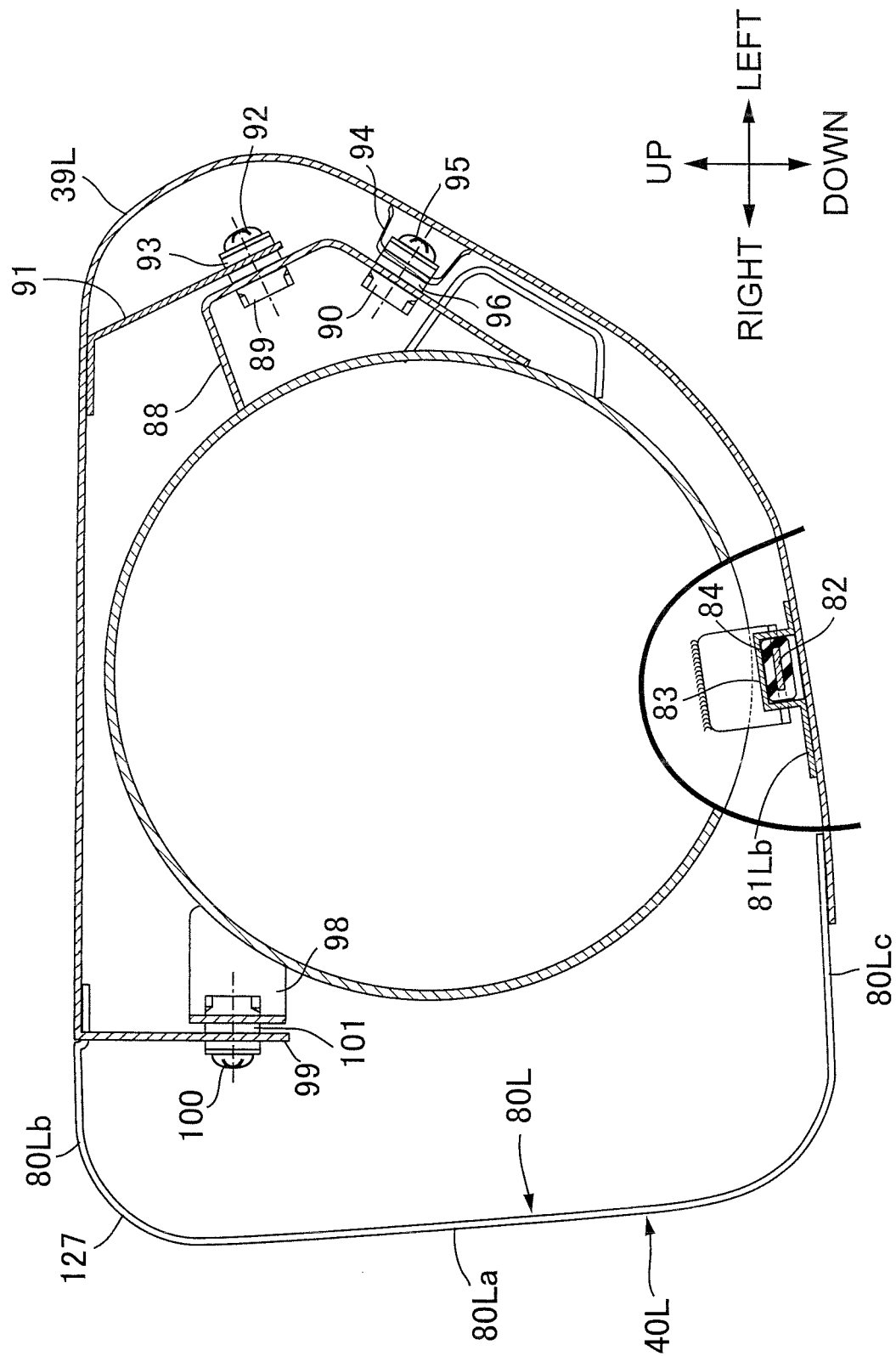
FIG. 12 is a sectional view along line 12-12 in FIG. 2. (first embodiment)

In FIG. 7, a casing 43R of the right exhaust muffler 30R is formed from a tubular casing main body 44R, a front end wall 45R joined to a front end part, in the vehicle fore-and-aft direction, of the casing main body 44R, and a rear end wall 46 joined to a rear end part of the casing main body 44R in the vehicle fore-and-aft direction.

A recess part 78 that is recessed to the side away from the rear wheel WR is formed in a side wall portion of a front part of the casing 43R in the vehicle fore-and-aft direction, that is, a side wall facing the rear wheel WR side of a front part of the casing main body 44R, in order to avoid interference with peripheral equipment of the rear wheel WR, for example, a component forming a brake mechanism fitted to the rear wheel WR. Because of this, the front part of the casing 43R of the right exhaust muffler 30R is formed with a smaller diameter than that of the rear part, a first partition wall 49R fixed to a front inner peripheral face of the casing main body 44R is formed so as to be smaller than a second partition wall 50 fixed to a rear inner peripheral face of the casing main body 44R, and the front end wall 45R is formed so as to be smaller than the rear end wall 46.

The upstream end of the first communication pipe 55, which is long due to it extending through the first and second partition walls 49R and 50, is disposed within the casing 43R in a portion corresponding to the recess part 78.

Referring in addition to FIG. 8 to FIG. 12, the left muffler protector 40L, which covers the left exhaust muffler 30L, is formed from a left inner protector half body 80L covering the left exhaust muffler 30L from the rear wheel WR side, that is, the right side in the vehicle width direction, and a left outer protector half body 81L, which covers the left exhaust muffler 30L from the outside of the vehicle opposite to the rear wheel WR, that is, the left side in the vehicle width direction.

The left outer protector half body 81L has a shape opening toward the rear wheel WR side, and in this embodiment it is formed so as to cover the left exhaust muffler 30L along the entire length thereof in the longitudinal direction from below, above, and the left while having a substantially U-shaped cross-sectional shape opening toward the rear wheel WR side. That is, the left outer protector half body 81L integrally has a flat plate-shaped upper wall portion 81La covering the left exhaust muffler 30L from above, a flat plate-shaped lower wall portion 81Lb covering the left exhaust muffler 30L from below, and a side wall portion 81Lc inclined so as to be closer to the left exhaust muffler 30L in going downward and joining the upper wall portion 81La and the lower wall portion 81Lb on the left side of the left exhaust muffler 30L.

On the other hand, the left inner protector half body 80L has a shape opening toward the side opposite to the rear wheel WR, and in this embodiment it is formed so as to cover a rear part, in the vehicle fore-and-aft direction, of the left exhaust muffler 30L from the right side while having a substantially U-shaped cross-sectional shape opening toward the side opposite to the rear wheel WR. That is, the left inner protector half body 80L integrally has a vertical wall portion 80La extending in the vertical direction on the right side of the rear part of the left exhaust muffler 30L, an upper horizontal wall portion 80Lb extending rightward from the upper end of the vertical wall portion 80La, and a lower horizontal wall portion 80Lc extending rightward from the lower end of the vertical wall portion 80La.

The rear part of the left collecting exhaust pipe cover 39L in the vehicle fore-and-aft direction is formed so as to cover a front part of the left outer protector half body 81L from the outer side, and a first projecting piece 82 fixed to a lower part at the front end of the left exhaust muffler 30L and extending forward is inserted through and retained via a rubber 84 by a first retaining part 83 fixedly provided on an inner face of a lower part of the rear part of the left collecting exhaust pipe cover 39L. A second projecting piece 85 extending forward is projectingly provided on a front end part of the upper wall portion 81La of the left outer protector half body 81L, and the second projecting piece 85 is inserted through and retained via a rubber 87 by a second retaining part 86 fixedly provided on an inner face of an upper part of the rear part of the left collecting exhaust pipe cover 39L.

A first stay 88 to which first and second weld nuts 89 and 90 are fixed is provided on a left upper part of the front part of the left exhaust muffler 30L, a first mounting plate 91 fixed to the inner face of the rear part of the left collecting exhaust pipe cover 39L is fastened to the first stay 88 via a first screw member 92 screwed into the first weld nut 89 and a first mount rubber 93, and a second mounting plate 94 fixed to the inner face of the front part of the side wall portion 81Lc of the left outer protector half body 81L is fastened to the first stay 88 via a second screw member 95 screwed into the second weld nut 90 and a second mount rubber 96.

A second stay 97 to which a third weld nut 98 is fixed is provided on a right upper part of the front part of the left exhaust muffler 30L. On the other hand, a third mounting plate 99 is projectingly provided on the upper wall portion 81La of the left outer protector half body 81L so as to project downward from the right edge of the front end part, and the third mounting plate 99 is fastened to the second stay 97 via a third screw member 100 screwed into the third weld nut 98 and a third mount rubber 101.

That is, the front part of the left outer protector half body 81L is linked to the rear part of the left collecting exhaust pipe cover 39L and fastened to the front part of the left exhaust muffler 30L.

A rectangular mounting hole 103 for mounting a saddle bag guard 102 is formed in a left wall of the rear part of the left collecting exhaust pipe cover 39L, a first support plate 104 having a part thereof projecting from the mounting hole 103 is fixed to the inner face of the rear part of the left collecting exhaust pipe cover 39L, and the saddle bag guard 102 covering the mounting hole 103 is fastened to the first support plate 104.

A third projecting piece 107 projecting rearward is fixed to an upper face of the rear part of the left exhaust muffler 30L, and a fourth projecting piece 108 projecting rearward is fixed to a left face of the rear part of the left exhaust muffler 30L; the third projecting piece 107 is inserted through and retained via a rubber 111 by a third retaining part 109 provided on an inner face of a rear part of the upper wall portion 81La of the left outer protector half body 81L, and the fourth projecting piece 108 is inserted through and retained via a rubber 112 by a fourth retaining part 110 provided on an inner face of a rear part of the side wall portion 81Lc of the left outer protector half body 81L.

Referring in addition to FIG. 13, fifth and sixth projecting pieces 113 and 114 projecting rearward are fixed to two locations, spaced in the vehicle fore-and-aft direction, of the upper horizontal wall portion 80Lb of the left inner protector half body 80L, and the fifth and sixth projecting pieces 113 and 114 are inserted through and retained via rubbers 117 and 118 by fifth and sixth retaining parts 115 and 116 provided on the inner face of the rear part of the upper wall portion 81La of the left outer protector half body 81L.

Figure 14:
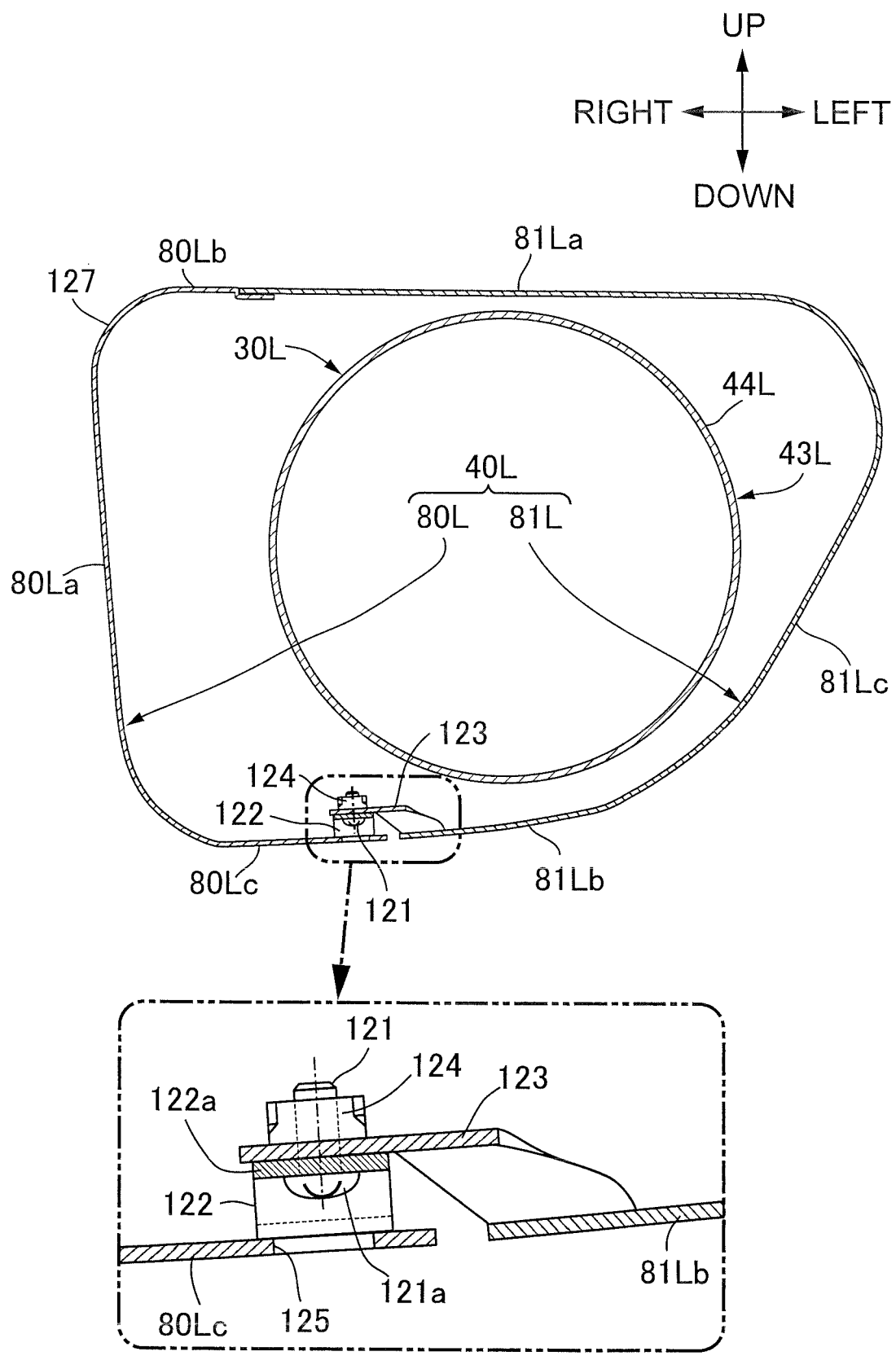
FIG. 14 is a sectional view along line 14-14 in FIG. 11. (first embodiment)

In FIG. 14, a lower part of the left inner protector half body 80L is fixed to a lower part of the left outer protector half body 81L by means of a fourth screw member 121, which is a single fastening member, and a third stay 122 having a mounting portion 122a projecting upward from an inner face of the lower horizontal wall portion 80Lc is provided on the lower part of the left inner protector half body 80L, that is, the inner face of the lower horizontal wall portion 80Lc. On the other hand, a second support plate 123 corresponding to the third stay 122 is fixed to the inner face of the rear part of the lower wall portion 81Lb of the left outer protector half body 81L, and a fourth weld nut 124 is fixed to the third support plate 123. Moreover, an opening 125 corresponding to the mounting portion 122a is formed in the lower horizontal wall portion 80Lc, the mounting portion 122a is fastened to the second support plate 123, that is, the lower part of the left outer protector half body 81L, by means of the fourth screw member 121, which is inserted into the opening 125 and screwed into the fourth weld nut 124, and an enlarged diameter head portion 121a of the fourth screw member 121 is housed within the lower part of the left inner protector half body 80L via the opening 125.

As described above the left inner protector half body 80L is detachably mounted on the left outer protector half body 81L mounted on the left exhaust muffler 30L, the left inner protector half body 80L is detachably mounted on the left outer protector half body 81L while maintaining a state in which the left outer protector half body 81L is mounted on the left exhaust muffler 30L, and a cap 126 is fitted onto a rear end part of the left muffler protector 40L.

Moreover, as clearly shown in FIG. 14 the left inner protector half body 80L and the left outer protector half body 81L have a polygonal cross-sectional shape (in this embodiment a quadrilateral shape), and they are combined so that a corner part 127, on the rear wheel WR side, of an upper side of the polygon is formed from the left inner protector half body 80L.

The right muffler protector 40R covering the right exhaust muffler 30R and having its rear end part fitted with the cap 126 is formed from a right inner protector half body 80R covering the right exhaust muffler 30R from the rear wheel WR side, that is, the left side in the vehicle width direction, and a right outer protector half body 81R covering the right exhaust muffler 30R from the side opposite to the rear wheel WR, that is, the right side in the vehicle width direction, and has basically the same structure as that of the left muffler protector 40L described above; parts corresponding to the left muffler protector 40L are denoted by the same reference numerals and symbols and only illustrated, and detailed explanation thereof is omitted.

The operation of the embodiment is now explained; in the left and right exhaust mufflers 30L and 30R, since the downstream end 55a of the first communication pipe 55 and the upstream end 57a of the first tailpipe 57 are disposed so as to be spaced from each other in the axial direction, one end part of the support member 75 having a circular cross section and a smaller diameter than that of the first communication pipe 55 and the first tailpipe 57 is fixed to one of the first lid member 63 covering the opening of the downstream end 55a of the first communication pipe 55 and the second lid member 72 covering the opening of the upstream end 57a of the second pipe, and the other end part of the support member 75 is slidably fitted into the other of the first lid member 63 closing the downstream end 55a of the first communication pipe 55 and the second lid member 72 closing the upstream end 57a of the first tailpipe 57, it is possible to mutually support the first communication pipe 55 and the first tailpipe 57 while allowing extension and shrinkage due to thermal expansion of the first communication pipe 55 and of the first tailpipe 57 by means of a gap between the first communication pipe 55 and the first tailpipe 57, thus making the length of the pipe be unaffected by restrictions and enhancing the degree of freedom in design of the left and right exhaust mufflers 30L and 30R.

Furthermore, since the opposite end parts of the support member 75, which is formed from a cylindrical pipe material, are disposed so as to extend through the first lid member 63 and the second lid member 72, it is possible, by making exhaust gas flow that has been blocked by the first and second lid members 63 and 72 flow via the support member 75, to obtain an effect in preventing the pressure at the downstream end 55a of the first communication pipe 55 from increasing excessively.

Moreover, since the support member 75 is disposed coaxially with the first communication pipe 55 and the first tailpipe 57, it is possible to equalize the flow of exhaust gas between the downstream end 55a of the first communication pipe 55 and the upstream end 57a of the first tailpipe 57, thus making it difficult for local build-up to occur.

Furthermore, since the seventh support tube portion 63a is projectingly provided integrally with one of the first lid member 63 and the second lid member 72, in this embodiment the first lid member 63, so as to project toward the side opposite to the second lid member 72, the one end part of the support member 75 extending through the seventh support tube portion 63a, and the outer peripheral face of the one end part of the support member 75 is welded via the seventh weld part 71 to the projecting edge of the seventh support tube portion 63a, it is possible, by preventing the weld bead of the seventh weld part 71 from decreasing the flow area in the interior of the support member 75, to ensure the flow performance.

Moreover, since the external diameter of the first tailpipe 57 is set to be smaller than the external diameter of the first communication pipe 55, it is possible, by making the thermal expansion characteristics of the first communication pipe 55 and of the first tailpipe 57 be different from each other, to prevent interference occurring therebetween due to the thermal expansions amplifying each other under the same conditions.

Furthermore, since the first tailpipe 57 extends through the rear end wall 46 of the casing 43L and is fixed to the rear end wall 46, and one end part of the support member 75 is fixed to the first lid member 63, even if a force due to frictional resistance between the second lid member 72 and the support member 75 slidably supported on the second lid member 72 is applied to the first tailpipe 57, it is possible to prevent there being a large influence on the parts via which the first tailpipe 57 and the casings 43L and 43R are joined.

Moreover, since the plurality of third punched holes 65 are formed in the side wall at least on the downstream side of the first communication pipe 55, it is possible to diffuse exhaust gas that has been blocked by the first lid member 63 into the third expansion chamber 53 via the third punched holes 65, thus reducing the exhaust gas pressure, decreasing the exhaust energy, and enhancing the muffling effect.

Furthermore, in the right exhaust muffler 30R, since the recess part 78, which is recessed toward the side away from the rear wheel WR, is formed in the side wall, facing the rear wheel WR side, of the front part of the casing 43R in the vehicle fore-and-aft direction, and the upstream end of the first communication pipe 55 extending through the first and second partition walls 49R and 50 disposed so as to be spaced in the vehicle fore-and-aft direction is disposed within the casing 43R in a portion corresponding to the recess part 78, although placement of the pipe is restricted due to formation of the recess part 78 for avoiding interference with peripheral equipment of the rear wheel WR, it is possible, by using effectively the first communication pipe 55, which has a long pipe length, to ensure the function of the right exhaust muffler 30R.

Moreover, since the left and right exhaust mufflers 30L and 30R disposed on the outer side of the rear wheel WR so as to overlap the rear wheel WR when viewed from the side are covered by the left and right muffler protectors 40L and 40R mounted on the exhaust mufflers 30L and 30R, the left and right muffler protectors 40L and 40R are formed from the left and right inner protector half bodies 80L and 80R covering the left and right exhaust mufflers 30L and 30R from the rear wheel WR side and the left and right outer protector half bodies 81L and 81R covering the left and right exhaust mufflers 30L and 30R from the vehicle outer side opposite to the rear wheel WR, and the left and right inner protector half bodies 80L and 80R are detachably mounted on the left and right exhaust mufflers 30L and 30R or the left and right outer protector half bodies 81L and 81R (in this embodiment the left and right outer protector half bodies 81L and 81R) while maintaining a state in which the left and right outer protector half bodies 81L and 81R are mounted on the left and right exhaust mufflers 30L and 30R, although the overall dimensions of the left and right exhaust mufflers 30L and 30R, including the left and right muffler protectors 40L and 40R, are large, it is possible to carry out maintenance by detaching only the left and right inner protector half bodies 80L and 80R, and maintenance can be carried out without temporarily detaching the left and right exhaust mufflers 30L and 30R each time maintenance is carried out while avoiding any influence on the bank angle by making it unnecessary to dispose the left and right exhaust mufflers 30L and 30R at positions away from the rear wheel WR on the outer side in the vehicle width direction, thus enhancing the ease of maintenance.

Furthermore, since the left and right outer protector half bodies 81L and 81R are formed so as to cover the entire length of the left and right exhaust mufflers 30L and 30R in the longitudinal direction, and the left and right inner protector half bodies 80L and 80R are formed so as to cover the rear parts, in the vehicle fore-and-aft direction, of the left and right exhaust mufflers 30L and 30R, it is possible to avoid any degradation of the appearance when viewed from the side opposite to the left and right exhaust mufflers 30L and 30R with respect to the rear wheel WR while minimizing the dimensions of the left and right inner protector half bodies 80L and 80R forming part of the left and right muffler protectors 40L and 40R.

Moreover, since the left and right outer protector half bodies 81L and 81R forming a shape opening toward the rear wheel WR side (in this embodiment a shape having a substantially U-shaped cross section opening toward the rear wheel WR side) and the left and right inner protector half bodies 80L and 80R forming a shape opening toward the side opposite to the rear wheel WR (in this embodiment a shape having a substantially U-shaped cross section opening toward the side opposite to the rear wheel WR) are combined so that the cross-sectional shape is a polygonal (in this embodiment a quadrilateral shape) and the corner part 127, on the rear wheel WR side, of the upper side is formed by the left and right inner protector half bodies 80L and 80R, the area that can be accessed from above the left and right exhaust mufflers 30L and 30R is widened when only the left and right inner protector half bodies 80L and 80R are detached, further enhancing the ease of maintenance.

Furthermore, since the left and right exhaust mufflers 30L and 30R covered by the left and right muffler protectors 40L and 40R are disposed on opposite sides in the vehicle width direction of the rear wheel WR, when carrying out maintenance of different parts from opposite sides of the rear wheel WR, it is unnecessary to temporarily detach the left and right exhaust mufflers 30L and 30R on the opposite sides, and maintenance can be carried out by detaching only the left and right inner protector half bodies 80L and 80R, thus enhancing the ease of maintenance.

Moreover, since the left and right inner protector half bodies 80L and 80R are detachably mounted on the left and right outer protector half bodies 81L and 81R mounted on the left and right exhaust mufflers 30L and 30R, it is difficult for heat to be transferred from the left and right exhaust mufflers 30L and 30R to the left and right inner protector half bodies 80L and 80R, and the time waiting for the temperature of the left and right inner protector half bodies 80L and 80R to decrease when carrying out maintenance can be shortened.

Furthermore, since the fifth and sixth projecting pieces 113 and 114 fixed to the left and right inner protector half bodies 80L and 80R are inserted into and retained via the rubbers 117 and 118 respectively by the fifth and sixth retaining parts 115 and 116 provided on the reverse faces of the left and right outer protector half bodies 81L and 81R, it is possible, by preventing the structure via which the left and right inner protector half bodies 80L and 80R are retained by the left and right outer protector half bodies 81L and 81R from being exposed to the outside, to avoid any degradation in the appearance of the left and right muffler protectors 40L and 40R.

Moreover, since the lower parts of the left and right inner protector half bodies 80L and 80R are fixed to the lower parts of the left and right outer protector half bodies 81L and 81R by means of the single fourth screw member 121, it is possible to strongly fix the left and right inner protector half bodies 80L and 80R to the left and right outer protector half bodies 81L and 81R at locations that are inconspicuous.

Furthermore, since the third stay 122 having the mounting portion 122a projecting upward from the inner face of the lower part of the left and right inner protector half bodies 80L and 80R is provided on the lower part of the inner protector half bodies 80L and 80R, the opening 125 corresponding to the mounting portion 122a is formed in the lower parts, and the mounting portion 122a is fastened to the lower part of the left and right outer protector half bodies 81L and 81R by means of the fourth screw member 121 inserted into the opening 125, it is possible to make it difficult for the fourth screw member 121 to be seen from the side of the left and right muffler protectors 40L and 40R, thus improving the appearance.

An embodiment of the present invention is explained above, but the present invention is not limited to the above embodiment and may be modified in a variety of ways as long as the modifications do not depart from the spirit and scope thereof.

For example, in the above embodiment the exhaust devices 21L and 21R equipped with the left and right exhaust mufflers 30L and 30R disposed on left and right sides of the rear wheel WR of a two-wheeled motor vehicle are explained, but the present invention can be applied to an exhaust device having an exhaust muffler disposed on either one of the left and right of a rear wheel or can be applied to an exhaust device of an internal combustion engine mounted on a saddled vehicle other than a two-wheeled motor vehicle, such as a three-wheeled motor vehicle.

The invention claimed is:

1. An exhaust device for an internal combustion engine of a saddled vehicle in which an exhaust muffler, configured to be disposed on an outer side of a rear wheel so as to overlap the rear wheel when viewed from a side, is covered by a muffler protector mounted on the exhaust muffler, wherein:
the muffler protector comprises an inner protector half body covering the exhaust muffler from a rear wheel side configured to be installed facing toward the rear wheel, and an outer protector half body covering the exhaust muffler from a vehicle outer side that is opposite to the rear wheel side,
the outer protector half body is a unitary member and configured so that the exhaust muffler is covered along an entire length thereof in a longitudinal direction of the exhaust muffler, and the inner protector half body is configured so as to cover only a side face of a rear part of the exhaust muffler in a vehicle fore-and-aft direction, the inner protector half body having an overall shape opening toward the vehicle outer side, and
the inner protector half body is detachably mounted on the exhaust muffler or the outer protector half body while maintaining a state in which the outer protector half body is mounted on the exhaust muffler,
and wherein a stay is provided on the lower part of the inner protector half body, the stay having a mounting portion projecting upwardly from an inner face of the lower part of the inner protector half body, an opening corresponding to the mounting portion is formed in the lower part of the inner protector half body, and the mounting portion is fastened to the lower part of the outer protector half body by a fastening member inserted into the opening.

2. The exhaust device according to claim 1, wherein the exhaust device comprises two exhaust mufflers and two muffler protectors, wherein one of the exhaust mufflers, covered by one of the muffler protectors, is configured to be disposed on each of two opposite sides in a vehicle width direction of the rear wheel.

3. The exhaust device according to claim 1, wherein the inner protector half body is detachably mounted on the outer protector half body which is mounted on the exhaust muffler.

4. The exhaust device according to claim 3, wherein a plurality of projecting pieces fixed to the inner protector half body are inserted and retained via rubbers by retaining parts provided at a plurality of locations on a reverse face of the outer protector half body.

5. The exhaust device according to claim 3, wherein a lower part of the inner protector half body is fixed to a lower part of the outer protector half body by the fastening member.

6. The exhaust device according to claim 1, wherein the exhaust muffler includes left and right exhaust mufflers respectively configured to be provided on left and right outer sides of the rear wheel, and wherein the muffler protector includes left and right muffler protectors mounted on the left and right exhaust mufflers, respectively.

7. An exhaust device for an internal combustion engine of a saddled vehicle in which an exhaust muffler, configured to be disposed on an outer side of a rear wheel so as to overlap the rear wheel when viewed from a side, is covered by a muffler protector mounted on the exhaust muffler, wherein:
the muffler protector comprises an inner protector half body covering the exhaust muffler from a rear wheel side configured to be installed facing toward the rear wheel. and an outer protector half body covering the exhaust muffler from a vehicle outer side that is opposite to the rear wheel side,
the outer protector half body is a unitary member and configured so that the exhaust muffler is covered along an entire length thereof in a longitudinal direction of the exhaust muffler, and the inner protector half body is configured so as to cover only a side face of a rear part of the exhaust muffler in a vehicle fore-and-aft direction, the inner protector half body having an overall shape opening toward the vehicle outer side,
the inner protector half body is detachably mounted on the exhaust muffler or the outer protector half body while maintaining a state in which the outer protector half body is mounted on the exhaust muffler, and
the outer protector half body has a shape opening toward the rear wheel side,
and the outer protector half body cooperates with the inner protector half body to define a polygonal cross-sectional shape and to form a corner part, on the rear wheel side, of an upper side of the polygon by means of the inner protector half body.

\* \* \* \* \*